(12) United States Patent
Dendy

(10) Patent No.: US 6,862,350 B2
(45) Date of Patent: Mar. 1, 2005

(54) INTEGRATED ACCESS DEVICE RESIDENT MECHANISM FOR AUTOMATICALLY ROUTING CALL TO SPECIFIED NUMBER UPON OFF HOOK SIGNALING EVENT

(75) Inventor: Scott William Dendy, Arab, AL (US)

(73) Assignee: Adtran, Inc., Huntsville, AL (US)

(*) Notice: Subject to any disclaimer, the term of this patent is extended or adjusted under 35 U.S.C. 154(b) by 692 days.

(21) Appl. No.: 09/844,971

(22) Filed: Apr. 27, 2001

(65) Prior Publication Data

US 2002/0159582 A1 Oct. 31, 2002

(51) Int. Cl.$^7$ .................................................. H04M 3/42
(52) U.S. Cl. ........................... 379/216.02; 379/355.01
(58) Field of Search ............................. 379/355.01, 36, 379/216.02, 216.01, 361

(56) References Cited

U.S. PATENT DOCUMENTS 4,802,208 A * 1/1989 Yeh .............................. 379/216
5,144,651 A * 9/1992 Cooper ........................ 379/216

* cited by examiner

*Primary Examiner*—Creighton Smith
(74) *Attorney, Agent, or Firm*—Allen, Dyer, Doppelt, Milbrath & Gilchrist, P.A.

(57) ABSTRACT

A digital communication link establishment control mechanism, termed 'dial on off-hook' (DOO) call routing, is incorporated into call routing control software employed by the microcontroller of an integrated access device (IAD). The DOO routine automatically routes an outgoing call to a user pre-specified destination number of a called circuit, in response to detecting an off-hook signaling state of the calling circuit. No user dialing is required.

6 Claims, 2 Drawing Sheets

INTEGRATED ACCESS DEVICE RESIDENT MECHANISM FOR AUTOMATICALLY ROUTING CALL TO SPECIFIED NUMBER UPON OFF HOOK SIGNALING EVENT

FIELD OF THE INVENTION

The present invention relates in general to communication systems, and is particularly directed to a digital communication link establishment control mechanism, which may be readily incorporated into control software employed by the microcontroller of an integrated access device (IAD), through which packetized digital communication services, such as voice, data and video, are supplied to a customer site, and is operative to selectively and automatically route an outgoing call to a user pre-specified destination number of a called circuit, in response to detecting an off-hook signaling state of the calling circuit.

BACKGROUND OF THE INVENTION

Digital subscriber loop (DSL)-based (packetized) communications allow telecommunication service providers to deliver multiple types of digital signalling channels (e.g., voice, data, video, and internet) at a fraction of the cost of conventional time division multiplexed (TDM)-based circuit switched networks. To deliver packetized voice and data, the service provider will typically deploy several different pieces of equipment (such as asynchronous transfer mode (ATM) switches, digital subscriber line access multiplexers (DSLAMs), voice gateways and the like) in the signal transport path from a central office to a customer premises-resident integrated access device (IAD).

For call routing control, the IAD contains a supervisory communications controller, which is programmed to interface telecommunication service (such as high speed T1 and integrated services digital network (ISDN) primary rate interface (PRI) traffic) between one or more network communication links ported to its network side and one or more customer premises equipment (CPE) ports on its user side. The interface signaling types do not necessarily match (for example, calls can originate on a loop start trunk and exit the IAD on a ground start trunk or PRI).

In the case of voice calls, the communications controller's control software will customarily contain a dialed number-based call routing mechanism through which outgoing voice calls from a user side interface may be routed to a called number via a preferred service provider based upon the phone number dialed. Conversely, incoming calls from the network side are routed to a user interface based upon the incoming number. The supervisory call routing and control routine may also accommodate standard channel bank fixed routing procedures, in which one or more prescribed ports will always be mapped to a predefined (DS0) port on another interface.

Now although the use of dialed number-based call routing provides an effective way to interface signaling traffic between various ports of a terminal unit, there are applications where it may be desired or necessary to route a call without the benefit of or even possibility of receiving dialed digits from the calling circuit.

SUMMARY OF THE INVENTION

In accordance with the present invention, the desire or need to route calls through a terminal unit, such as an integrated access device, without the dialing of digits is accomplished by augmenting the communications control software in the IAD's supervisory microcontroller to include a 'dial on off-hook' (DOO) call routing routine, through which an outgoing call may be automatically routed to a user pre-specified number, in response to a prescribed signaling event, such as the going off-hook signaling state of the device associated with the calling number. The DOO mechanism of the invention allows the user to include a pre-specified interface in the normal routing routine (for switched applications), yet still have one or more defined ports that are always routed to a specified (DS0) port on another interface.

Pursuant to a preferred embodiment, each physical interface that can have multiple ports, such as a T1 in the call routing routine, includes a dial on off-hook (DOO) menu configuration item. This DOO item is selectively invocable by the user to identify the source and destination circuits for which the DOO routine is to be employed. In operation, when a device goes off-hook, the DOO routine determines whether that device has been configured for DOO routing. If not, normal call routing is employed using dialed digits supplied from the sourcing/calling circuit (as by way of digital signal processor (DSP) based dual tone multi-frequency (DTMF) or multi-frequency (MF) signaling, for example). Once the dialed number digits have been collected, the call is routed to the destination number. If the called endpoint is available to accept the call, a voice path is connected and the call is established.

On the other hand, if the device is configured for DOO routing, the call is automatically routed to the destination circuit associated with the number in the DOO configuration field for the calling circuit. There is no dialing by the user. Then, if the called endpoint is available to accept the call, a voice path is connected and the call is established.

One application for routing a call without the use of dialed digits is a private branch exchange (PBX) that does not supply digits (which may be due to a configuration limitation), but requires connection to another interface (usually of a different signaling role) without dialing. Another use of the DOO mechanism of the invention involves special digits operation, wherein, rather than have digits dialed by the user side for delivery to the network, a voice path cut-through is to be provided, so that an immediate voice connection can be made without dialing. This feature is useful when a signaling conversion is needed. Examples of special digits include the * and # keys, used in voice mail.

The DOO mechanism of the invention also has application to generic channel banks employing private line automatic ring-down (PLAR) mode, that allows two phones to be connected, with one phone ringing when the other goes off hook. This requires two channel banks connected by a T1 link. With the DOO mechanism of the invention, the call can be switched within the IAD, without the need for number dialing by the user, and another phone ring connected to the same IAD.

DETAILED DESCRIPTION

Figure 1:
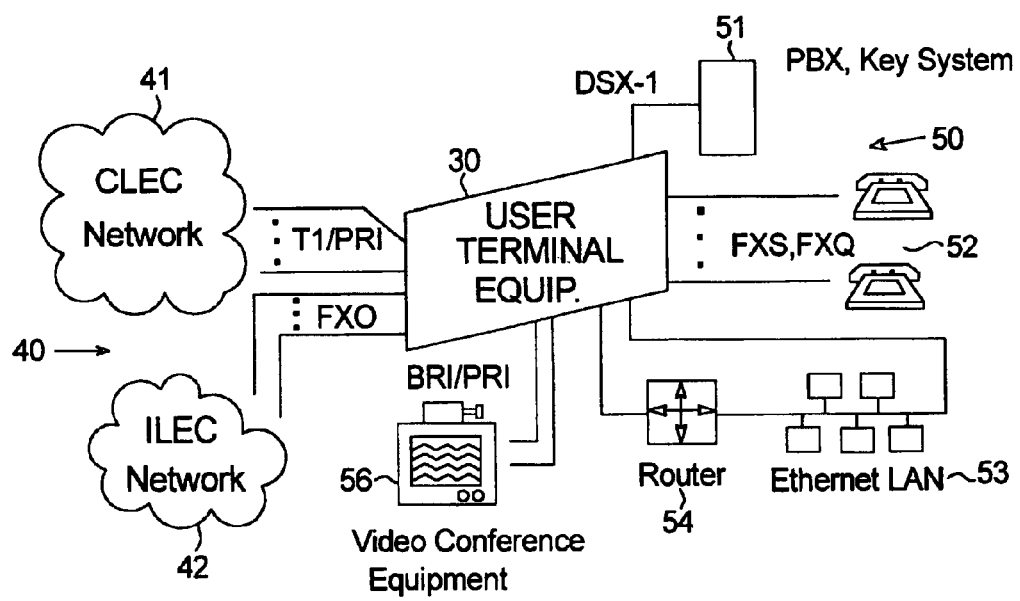
FIG. 1 diagrammatically illustrates an integrated access device installed at a customer premises which terminates multiple network communication circuits with various end user telecommunication devices.

Before describing in detail the new and improved 'dial on off-hook' (DOO) call routing mechanism of the invention, it should be observed that the present invention resides primarily in an augmentation of the call routing software employed by user terminal equipment, such as that employed by an integrated access device. The equipment itself is configured of conventional communication circuits and associated digital signal processing components and attendant supervisory control circuitry therefor, that controls the operations of such circuits and components.

As a consequence, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations and associated flow chart/state diagram are primarily intended to show the interfacing of user terminal equipment with a telco network and customer premises user devices in a convenient functional grouping, whereby the present invention may be more readily understood.

Attention is initially directed to FIG. 1, which diagrammatically illustrates the interfacing of user terminal equipment 30, such as an integrated access device installed at customer premises, with multiple network communication circuits 40 serving various end user telecommunication devices 50. For purposes of providing a non-limiting example, the user terminal equipment may comprise an Atlas 550 integrated access device (IAD), manufactured by Adtran Inc., Huntsville, Ala. On the network side, the communication circuits 40 may include a plurality of T1/PRI circuits of a competitive local exchange carrier (CLEC) network 41 and a plurality of foreign exchange (FX) circuits of an incumbent local exchange carrier (ILEC) network 42. On the user side, the user telecommunication devices 50 may include a DSX-1 link terminating a private branch exchange (PBX) 51, a plurality of FXS and FXO circuits serving respective telephone devices 52, data links serving a local area network 53 and an associated router 54, and BRI/PRI links terminating video conference equipment 56.

The communication control software running on the IAD's control processor includes a dialed number-based call routing mechanism which, like a conventional call routing scheme described previously, is operative to route an outgoing call from a user side device 50 to a destination circuit, and an incoming call from a network side circuit 40 to a destination user interface device based upon the number dialed.

Figure 2:
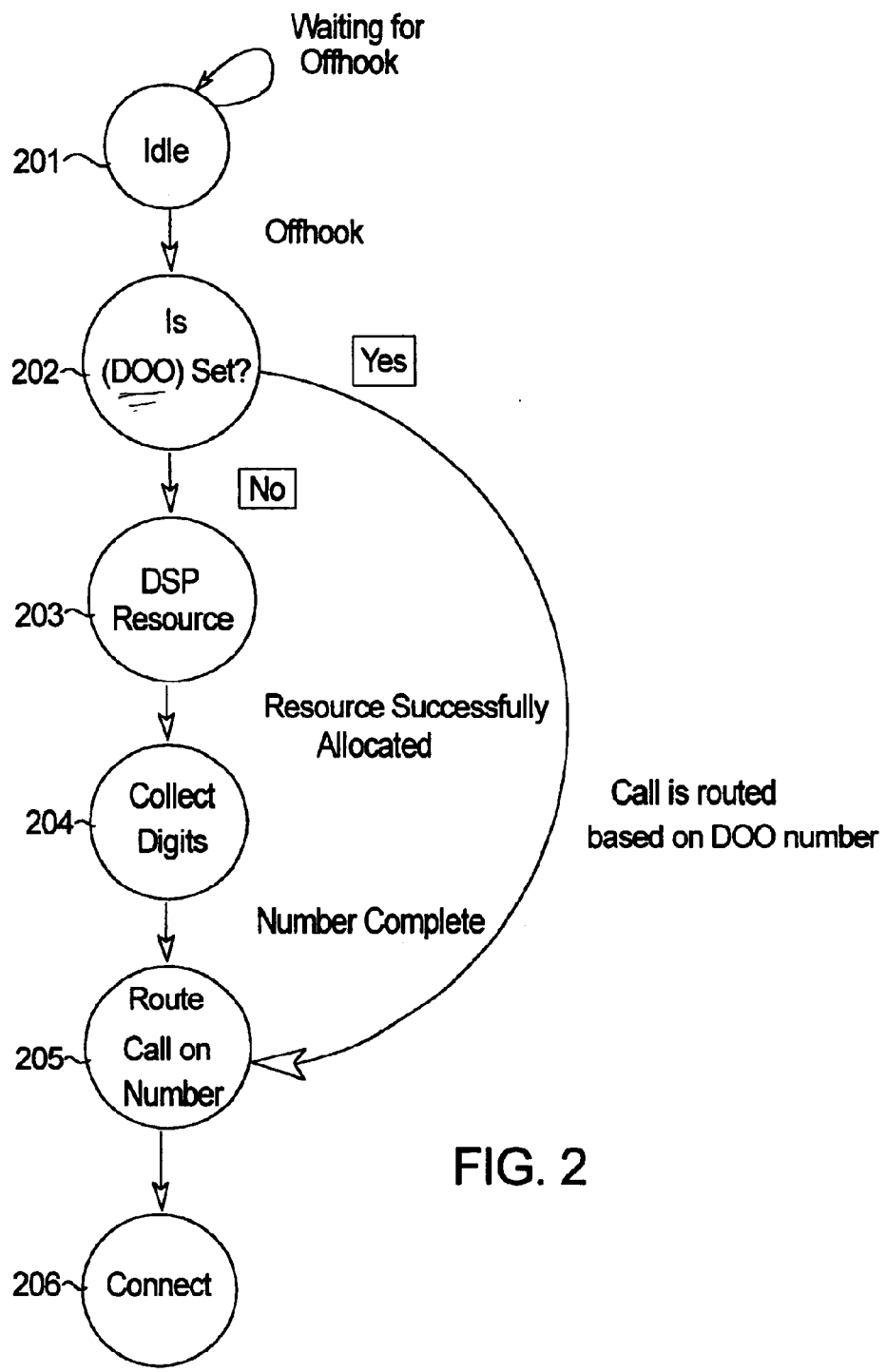
FIG. 2 is a flow chart/state diagram of a 'dial on off-hook' call routing mechanism of the present invention.

In addition, in accordance with the present invention, the call routing mechanism includes a 'dial on off-hook' (or DOO) routine (a flow chart/state diagram for which is shown in FIG. 2, to be described), through which an outgoing call is automatically routed to a user specified number, in response to a prescribed signaling state, such as a going off-hook signaling state, of the device associated with the calling number, without the need for dialing of called number digits by the user device. This augmentation of the call routing software executed by the IAD's control processor allows a user to pre-specify a 'unique' number that is to be automatically forwarded to the switchboard when a particular calling circuit goes off-hook, thus ensuring that the call will be immediately routed to a specific destination.

As pointed out above, through the use of the DOO mechanism, the user is able to include a specified interface in the normal routing routine (for switched applications), yet still have one or more defined ports that are always routed to a specified (DS0) port on another interface. The DOO mechanism of the invention, when invoked, automatically forwards this number to the switchboard, which then routes the call to the interface that is configured to accept the number.

In a preferred embodiment, each endpoint (physical interface that can have multiple ports, such as a T1) in the call routing routine includes a dial on off-hook menu configuration item, which is selectively employed by the user to identify the dialed number associated with this circuit for which the DOO is to be employed to route a call in accordance with the DOO mechanism of the invention.

Referring now to the flow chart/state diagram of the 'dial on off-hook' call routing routine of the invention shown in FIG. 2, at a first state 201, a respective call-sourcing interface is shown as being in an on-hook or idle state (waiting for an off-hook condition). When the device goes off-hook, its signaling state changes or transitions to state 202, wherein a determination is made as to whether its DOO parameter has been previously configured by the user for DOO routing, as described above. The state machine of the call routing routine may be notified of a DOO-triggering signaling event (going off-hook) by the T1framer (or voice card reporting).

If the answer to the query state 202 "DOO set?" is NO, indicating that the this particular interface has not been configured for DOO routing (namely, there is no number written into the DOO configuration field), it is inferred that normal call routing is to be employed using dialed digits supplied from the sourcing device (as by way of digital signal processor (DSP) based dual tone multi-frequency (DTMF) or multi-frequency (MF) signaling, for example). In this case, the routine transitions to state 203, and calls up a DTMF/MF detection subroutine. It also maps the received time division multiplexed (TDM) stream (voice path from the phone/DS0) to the digit detection subroutine. In addition, the transmit TDM stream is mapped another DSP DS0 channel that provides dial tone, indicating to the user to begin a dialing sequence.

In response to successful allocation of the DTMF/MF detection subroutine, the call routing routine transitions to state 204, wherein the dialed digits are collected to identify the (called) number of the destination circuit. Once the dialed number digits have been collected, the routine transitions to state 205, and the call is routed to the destination circuit identified by the dialed number. If the called endpoint is available to accept the call, a voice path is connected in state 206 and the call is established.

On the other hand, if the answer to the query state 202 is YES, indicating that the user has configured this particular interface for DOO-based call routing (so that there is a number written into the DOO configuration field), the routine transitions directly to state 205, and the call is routed to the destination circuit associated with the number in the DOO configuration field. No dialing by the user is employed. If the called endpoint is available to accept the call, a voice path is connected in state 206 and the call is established, as described above.

Non-limiting examples of applications where it is desired to route a call without the benefit of or possibility of receiving dialed digits from the sourcing device include a PBX that does not supply digits, the use of special digits and a pseudo-PLAR channel bank mode. In the first case, a PBX may have a configuration limitation, that does not provide digits, but requires that it be connected to another interface (usually of a different signaling role) without dialing. This type of signaling conversion is readily accomplished with the DOO call routing mechanism of the invention.

For special digits operation, the DOO mechanism may be used on the network side of the IAD in conjunction with what is known as digit suppression mode. In this mode, rather than have digits dialed by the user side for delivery to the network, all that is required is a voice path cut-through, so that an immediate voice connection can be made without dialing. This feature is useful when a signaling conversion is needed. Examples of special digits include * and # keys, such as those used by voice mail systems, but which are not otherwise valid to route a call through a switchboard.

In generic channel banks, PLAR is a mode that allows two phones to be connected, with one phone ringing when the other goes off hook. This requires a T1port and two channel banks. With the DOO mechanism of the invention, the call can be switched within the IAD, without the need for any number dialing by the user, and another phone ring-connected to the same IAD. This operation may be termed intrabox PLAR.

As will be appreciated from the foregoing description of the invention, the desire to route calls through an integrated access device without dialing digits is readily accomplished by augmenting the communications control software in the IAD's supervisory microcontroller to include a 'dial on off-hook' (DOO) call routing routine, through which an outgoing call is automatically routed to a specified number, in response to on off-hook signaling state of the device associated with the calling number. The DOO mechanism of the invention allows the user to include a specified interface in the normal routing routine for switched applications, yet have one or more defined ports that are always routed to a specified (DS0) port on another interface.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. A method of controlling the operation of an integrated access device (IAD), which contains a call routing mechanism that is adapted to route a call therethrough from a calling circuit to a called circuit in accordance with the number of said called circuit being dialed by way of said calling circuit, said method comprising the steps of:

(a) selectively storing a prescribed destination circuit number in association with a calling circuit which is adapted to originate a call; and (b) in response to said calling circuit, for which said prescribed destination circuit number has been selectively stored in step (a), having a prescribed signaling state, automatically routing a call therefrom to said destination circuit without the number of said destination circuit being dialed by said calling circuit.

2. A method of controlling the operation of a telecommunications routing device, which contains a call routing mechanism that is adapted to route a call therethrough from a calling circuit to a called circuit in accordance with the number of said called circuit being dialed by way of said calling circuit, said method comprising the steps of:

(a) selectively storing a prescribed destination circuit number in association with a calling circuit which is adapted to originate a call; and (b) in response to said calling circuit, for which said prescribed destination circuit number has been selectively stored in step (a), having a prescribed signaling state. automatically routing a call therefrom to said destination circuit without the number of said destination circuit being dialed by said calling circuit, and wherein step (b) comprises, in response to said calling circuit having said prescribed signaling state, determining whether a prescribed destination circuit number has been stored therefor and, in response to said calling circuit having no prescribed destination circuit number stored therefor, routing a call from said calling circuit to a called circuit having a number dialed by said calling circuit.

3. The method according to claim 1, wherein said prescribed signaling state corresponds to said calling circuit going off-hook.

4. For use with a digital processor-controlled integrated access device containing controlling a call routing software routine that is adapted to route a call therethrough from a calling circuit to a called circuit in accordance with the number of said called circuit being dialed by way of said calling circuit, a method of providing a communication path between said calling circuit and a prescribed destination circuit without the number of said prescribed destination circuit being dialed by way of said calling circuit, said method comprising the steps of:

(a) storing the number of said prescribed destination circuit number in association with the potential origination of a call from said calling circuit; and (b) in response to said calling circuit going off-hook, automatically accessing the number of said prescribed destination circuit as stored in step (a), and using the accessed number to automatically provide a communication path between said calling circuit and prescribed destination circuit exclusive of any dialing of the number of said destination circuit by said calling circuit.

5. The method according to claim 4, wherein step (b) comprises, in response to said calling circuit going off-hook, initially determining whether the number of any prescribed destination circuit number has been stored therefor and, in response to said calling circuit having no prescribed destination circuit number stored therefor, routing a call from said calling circuit to a called circuit having a number dialed by said calling circuit.

6. A method of controlling the routing of a call through an integrated acces device (IAD) comprising the steps of:

(a) providing a call routing routine that is adapted to control the routing of a call through said (IAD) from a calling circuit to a called circuit in accordance with the number of said called circuit, said call routing routine being configured to selectively store the number of a destination circuit number in association with the potential origination of a call from a calling circuit;

(b) in response to a respective calling circuit going off-hook, causing said call routing routine to determine whether it contains the number of a respective destination circuit in association with said respective calling circuit; and (c) in response to step (b) determining that said call routing routine contains the number of a respective destination circuit number in association with said respective calling circuit, automatically accessing the number of said respective destination circuit and using the accessed number to automatically provide a communication path between said respective calling circuit and said respective destination circuit exclusive of any dialing of the number of said respective destination circuit by said respective calling circuit, but otherwise routing a call from said respective calling circuit to a called circuit in accordance with the number thereof as dialed by said respective calling circuit.

* * * * *